United States Patent
Anumulapally et al.

(10) Patent No.: US 12,333,023 B2
(45) Date of Patent: Jun. 17, 2025

(54) IN-BAND CLASS OF SERVICE SIGNALING FOR CRYPTOGRAPHIC SERVICES ON AN HSM

(71) Applicant: THALES DIS CPL USA, INC., Austin, TX (US)

(72) Inventors: Ranga Anumulapally, Pembroke Pines, FL (US); Wayne Reed, Kemptville (CA); Marc Boillot, Plantation, FL (US)

(73) Assignee: THALES DIS CPL USA, INC., Austin, TX (US)

( * ) Notice: Subject to any disclaimer, the term of this patent is extended or adjusted under 35 U.S.C. 154(b) by 293 days.

(21) Appl. No.: 18/073,808

(22) Filed: Dec. 2, 2022

(65) Prior Publication Data

US 2024/0184896 A1  Jun. 6, 2024

(51) Int. Cl.
*H04L 9/00* (2022.01)
*G06F 21/60* (2013.01)
*G06F 21/85* (2013.01)

(52) U.S. Cl.
CPC .......... *G06F 21/602* (2013.01); *G06F 21/604* (2013.01); *G06F 21/85* (2013.01)

(58) Field of Classification Search
CPC ...... G06F 21/602; G06F 21/604; G06F 21/85; G06F 21/72; G06F 21/57; H04L 63/0485; H04L 2209/56; G06Q 20/3823
See application file for complete search history.

(56) References Cited

U.S. PATENT DOCUMENTS

| | | | |
|---|---|---|---|
| 8,675,875 B2 | 3/2014 | Yellepeddy et al. | |
| 8,683,222 B2 | 3/2014 | Yellepeddy et al. | |
| 9,571,279 B2 | 2/2017 | Kancharla et al. | |
| 2008/0022136 A1 | 1/2008 | Mattsson et al. | |
| 2013/0055295 A1 | 2/2013 | Dayka et al. | |
| 2015/0134953 A1 | 5/2015 | Seabor et al. | |
| 2016/0140343 A1* | 5/2016 | Novak .................. | G06F 21/575 713/2 |
| 2021/0019740 A1* | 1/2021 | Bhamidipati ........ | G06Q 20/382 |

OTHER PUBLICATIONS

Title: "gRPC with REST and Open APIs", Author: Phillips, Published May 9, 2016 (Year: 2016).*
International Search Report (PCT/ISA/210) & Written Opinion (PCT/ISA/237) mailed by ISA/EP on Apr. 17, 2024 for corresponding International Application pursuant to the PCT, N°PCT/US2023/081999 (16 pages).

(Continued)

*Primary Examiner* — Syed M Ahsan

(57) ABSTRACT

Provided is a system, method and API that provides HSM customers with an ability to request different levels of service for any cryptographic workload. It provides the customer with an API that by way of a Class of Service (CoS) attribute signals a higher class/level of service at the application level, such as a faster response time, for example, certain time-sensitive or high priority requests, that are not currently available in HSM deployments. The CoS attribute resides at the application level and provides developers of crypto API client application to prioritize crypto transaction performance.

14 Claims, 8 Drawing Sheets

(56) References Cited

OTHER PUBLICATIONS

Brandon Phillips: "The gRPC Blog—gRPC with REST and Open APis", May 9, 2016 (May 9, 2016), pp. 1-4, XP055708338, Retrieved from the Internet: URL:https://grpc.io/bl.og/coreos/[retrieved on Jun. 24, 2020) the whole document.
Wikipedia: "Hardware security module", Oct. 8, 2021 (Oct. 8, 2021), XP093049665, Retrieved from the Internet: URL:https://en.wikipedia.org/w/index.php?titl.e=Hardware_security.JQodul.e&oldid=I.048886908 [retrieved on May 25, 2023]—the whole document.

\* cited by examiner

100

| Crypto Op | vHSM1 | vHSM2 | CoS (vHSM1/vHSM2) |
|---|---|---|---|
| Encrypt | 2540 | 2600 | 1/1 |
| Decrypt | 2540 | 2600 | 1/1 |
| Sign | 81 | 42 | 1/3 |
| Verify | 121 | 103 | 2/1 |
| Key Generate | 43 | 43 | 3/3 |

\# Operations (e.g. Transactions Per Second)

600
FIG. 6

IN-BAND CLASS OF SERVICE SIGNALING FOR CRYPTOGRAPHIC SERVICES ON AN HSM

TECHNICAL FIELD

The present embodiments relates generally to Hardware Security Modules (HSM), and more particularly, to signaling within cryptographic services at the application level for managing cryptographic transaction workloads.

BACKGROUND

A Hardware Security Module (HSM) is a dedicated crypto processing unit specifically designed for the hardware protection of the cryptographic key lifecycle. HSMs act as trust anchors that protect the crypto infrastructure of some of the most security-conscious organizations in the world by securely managing, processing, and storing cryptographic keys inside a hardened, tamper-resistant device. Enterprises use hardware security modules to protect transactions, identities, and applications, as HSMs excel at securing cryptographic keys and provisioning encryption, decryption, authentication, and digital signing services for a wide range of applications. HSMs protect keys and are used by applications in on-premise, virtual, and cloud environments. They are hardware devices that can be stored in racks in a data center and associated with cryptographic networking components. They can be deployed and securely configured remotely in any of these environments. Because they are secure and operate on sensitive data, only authorized applications are allowed access.

The HSM typically offers cryptographic services via custom or standard cryptography Application Programming Interface (API). Software entities, generally termed as API clients, utilize cryptographic services by sending the API requests to the HSM over secure/authenticated communication channels. The HSM processes the API requests on a first come first service basis. Under heavy traffic conditions, API requests from some clients may be starved of cryptographic resources inside the HSM leading to significant impact on crypto command response times. Time-sensitive operations may not be completed within expected time leading to poor user experience.

To alleviate these conditions, customers typically over-engineer or increase their HSM capacity, which is an expensive approach. Although customers could implement general traffic throttling on the client side, it is not so effective across multiple clients.

SUMMARY

In some embodiments, a system, method and API provide HSM customers with an ability to request different levels of service for different cryptographic workloads. This is more advantageous than having the HSM process the requests from API clients on a first come first serve basis. It provides the customer with an API that byway of a Class of Service (CoS) attribute signals a higher class/level of service at the application level for faster/priority response times for certain desired time-sensitive or high priority requests, that are not currently available in on-premise or cloud HSM deployments. The CoS attribute resides at the application level and provides developers of crypto API client applications a means to prioritize crypto transaction performance.

In one embodiment, a Hardware Security Module (HSM) exposes an API to establish a Class of Service (CoS) on cryptographic transactions requested from at least one Crypto API Client. The HSM includes a Main Processor hosting an HSM app exposing said API to said at least one Crypto API Client, and a Security Processor specialized to accelerate processing of said cryptographic transactions in hardware (HW) on the HSM based on the Class of Service (CoS) attribute. The API includes a method to handle a Class of Service (CoS) attribute from at least one Crypto API Client via in-band signaling for a desired cryptographic service. The CoS attribute signals a higher level of service for time-sensitive and high priority requests processing of the cryptographic transactions on the HSM.

In another embodiment, an Application Programming Interface (API) establishes an in-band Class of Service (CoS) on cryptographic transactions in a Hardware Security Module (HSM). The API includes a method to handle a Class of Service (CoS) attribute on at least one Crypto API Client via in-band signaling for a desired cryptographic service to signal a higher level of service for time-sensitive and high priority requests processing of the cryptographic transactions on the HSM.

In another embodiment, a method of in-band signaling to establish a Class of Service (CoS) on cryptographic transactions of a Hardware Security Module (HSM) is also provided. The method comprises the steps of: by way of an Application Programming Interface (API) exposed on an HSM app on said HSM, responding to a first API method to handle a Class of Service (CoS) attribute by at least one Crypto API Client via in-band signaling for a desired cryptographic service, wherein the CoS attribute signals a higher level of service for time-sensitive and high priority requests of the cryptographic transactions processed on the HSM. The method further comprises propagating the CoS attribute for at least one Crypto API Client to intermediate nodes in a network path involved in processing the cryptographic transactions across multiple HSMs, where the intermediate nodes support a card scheme for a payment network and a node therein is one among: a payments merchant, a payments acquirer, a payments switch, and a payments issuer. The step of propagating includes both passing and setting the CoS attribute on HSMs associated with the intermediate nodes.

BRIEF DESCRIPTION OF THE DRAWINGS

The accompanying drawings, which are incorporated in and constitute a part of this description, illustrate embodiments consistent with the embodiments and, together with the description, serve to explain the principles of the embodiments.

FIG. 6 is an exemplary table showing number of crypto transactions handled in the HSM based according to Class of Service (CoS) in accordance with an embodiment.

Figure 1:
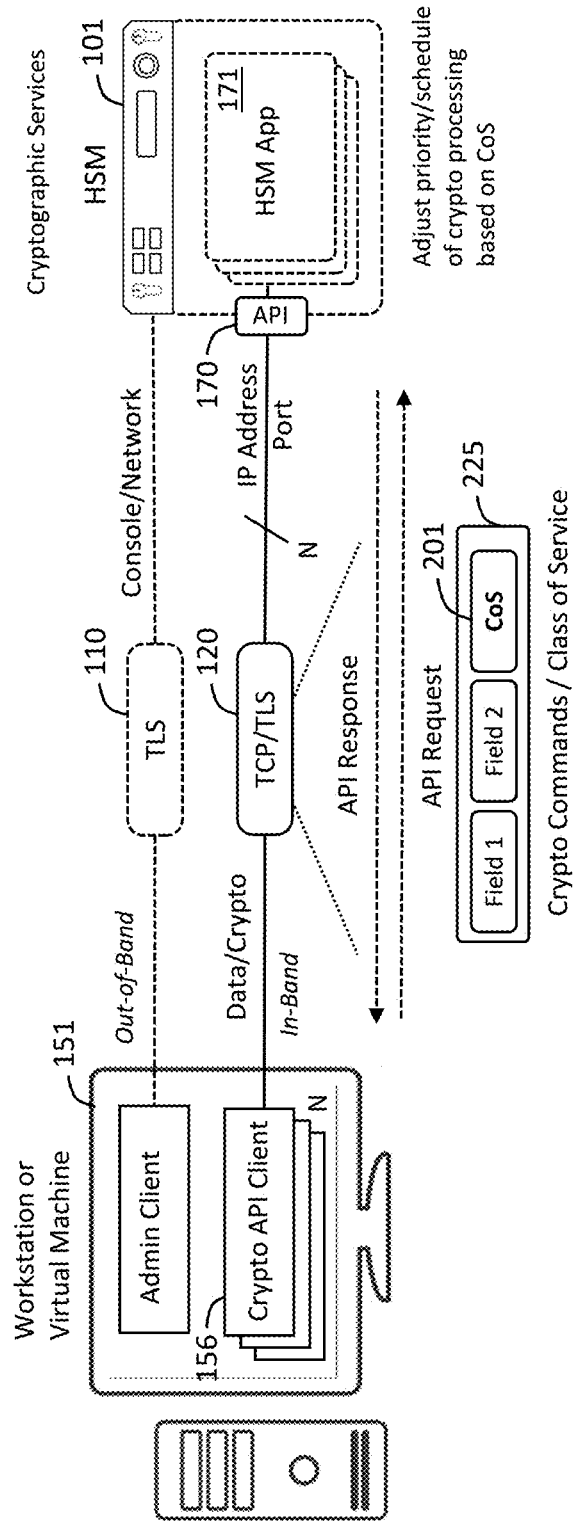
FIG. 1 illustrates a Hardware Security Module (HSM) providing cryptographic services to a remote workstation or virtual machine in accordance with one embodiment.

Specific embodiments have been shown by way of example in the foregoing drawings and are hereinafter described in detail. The figures and written description are not intended to limit the scope of the inventive concepts in any manner. Rather, they are provided to illustrate the inventive concepts to a person skilled in the art by reference to particular embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the embodiments. Instead, they are merely examples of apparatuses and methods consistent with aspects related to the embodiments as recited in the appended claims.

In the context of the present description, an HSM is a hardened, tamper-resistant device that secure cryptographic processes by generating, protecting, and managing keys used for encrypting and decrypting data and creating digital signatures and certificates. A "cloud HSM" provides same functionality as on-premises HSMs with the benefits of a cloud service deployment, without the need to host and maintain on premises appliances. A HSM deployment can provide for Software as a Service (SaaS), Platform as a Service (PaaS), or Infrastructure as a Service (IaaS) models.

A "general purpose" (GP) HSM is a hardened, tamper-resistant hardware device that strengthen encryption practices by generating keys, encrypting and decrypting data, and creating and verifying digital signatures. GP HSMs may be assembled in clusters and act as a single hardware Root of Trust. It is a critical component of public key infrastructures (PKIs) to generate and protect root and certificate authority keys; code signing to ensure software remains secure, unaltered and authentic; and creating digital certificates for credentialing and authenticating proprietary electronic devices for Internet of Things (IoT) applications and other network deployments. A General Purpose HSM is flexible and can be used in any application that uses cryptographic keys which does not require the additional security controls and regulations imposed by a Payment HSM. Examples include management of the symmetric keys used for database encryption, and management and use of the asymmetric keys used for the creation of digital signatures and certificates to support PKI (Public Key Infrastructure) and crypto wallets. In some embodiments, the HSM is a PCIe card that plugs into a server, or a USB device that attaches to a port on a server.

A "payment" HSM is a hardened, tamper-resistant hardware device that is used primarily by the retail finance or banking industry to provide high levels of protection for cryptographic keys and customer PINs used during the issuance of magnetic stripe and EMV chip cards (and their mobile application equivalents) and the subsequent processing of credit and debit card payment transactions. Payment HSMs normally provide native cryptographic support for all the major card payment applications and undergo rigorous independent hardware certification. Payment HSMs and management tools provide flexible, efficient transaction security for retail payment processing environments, internet payment applications, and web-based PIN delivery.

The main role of a payment HSM is to protect cryptographic keys and other security sensitive data in a highly secure manner, such that the integrity of the overall payment process is maintained, and provide audit and system logs of HSM usage. To that end, HSMs offer the highest level of security by always storing cryptographic keys in intrusion-resistant hardware and providing up to date reporting of its operation. Commonly, HSMs are housed in a data center of a computing resource provider or any similar securely hosting area. More specifically, any payment HSM hosted in the data center may be attached directly to a server, for instance in a rack, and can be accessed on-site by an operator e.g., through console attach to the HSM via a universal serial bus (USB) connection implementing a USB-C interface, for example.

In described embodiments, there will be considered the non-limiting example of a cloud-based (web-based) system architecture, wherein one or more virtualized HSMs is housed in a data center and is accessible/configurable by users, or an API, through the Internet as a communication network to manage a class of service on virtual processes on the HSM, wherein a virtual function therein may share same hardware resources of the HSM with other hosting service provider application tenants. An operator is a user with administrative privileges for configuring the HSM, for example, a system administrator having their own password and a separate device card, such as a Java Card, for providing additional credentials. Here, a user can also refer to an operator with special privileges above a normal user.

FIG. 1 illustrates a Hardware Security Module (HSM) 101 to provide cryptographic services to a remote workstation (or virtual machine) 151 in accordance with one embodiment. The workstation (or virtual machine) 151 hosts one or more Crypto API Clients 156 for generating cryptographic service requests with the HSM 101. A Crypto API Client 156 is a software application that runs on the workstation 151 and invokes the API 170 to interface to the HSM 101. A resulting cryptographic service request may be, but not limited to, data encryption/decryption, key generation/management, and/or PKI actions (signing, verification, etc.) among others. Cryptographic services, commands and data 225 are communicated between the HSM 101 over a secure TCP/TLS communication channel 120, for example, terminating on an Internet Protocol (IP) address and port of the HSM.

Each Crypto API Client 156 interacts with the HSM 101 via the API 170 over the secure TCP/TLS communication channel 120 to ensure data communicated there between is secure. Associated responses and requests between the HSM 101 and one or more Crypto API Clients 156 includes fields related to the desired cryptographic services, for example, and includes a Class of Service (CoS) attribute 201. Here, customers can request/signal the desired Class of Service (CoS) 201 for a desired cryptographic service (including individual crypto commands 225) within each of the Crypto API Clients 156 (i.e. "In-band CoS request/signal"). Briefly, "In-band" refers to the ability to signal CoS needed within each cryptographic API, in contrast to some "out-of-band" mechanisms that might include separate dedicated connections (between the API client and the HSM) to process requests with different CoS needs.

The CoS attribute 201 is a mechanism that provides an intelligent and fine-grained approach where crypto API clients 156 can dynamically request different levels of service for different cryptographic workloads associated with the crypto commands 225 based on their needs It is a mechanism for the client to signal the desired Class of Service (CoS) within each call of the API 170 (for a particular crypto command) to indicate that the client wants a particular level of service for that API call. The HSM 101 allocates appropriate compute resources (software and hardware) to process the API 170 at the requested CoS level. Accordingly, the CoS attribute 201 mechanism is termed as "In-band Class of Service Signaling" in contrast to certain out-of-band approaches where separate secure communication channels maybe used for different cryptographic workloads to achieve some limited and rudimentary traffic management.

In one arrangement, the workstation (or virtual machine) 151 may include an Administrative Client (e.g. Thales LunaSH®, Thales payShield Manager®) to configure the HSM 101 over a serial or secure 110 communication channel, for example, to manage the HSM console or HSM network settings. On the HSM/vHSM, administrators can explicitly enable/disable the CoS attribute 201 on a per-client basis, which may be based on IP address/port basis or Master-Key basis. The Administrative Client may prevent misuse of CoS attribute 201 by the customer's developers and provides for appropriate pricing or licensing of the CoS feature in an HSM cloud deployment. CoS signaling may also be applied to administration API as well (to prioritize certain admin API) over secure 110 communication channels. In some embodiments, the CoS signaling for administrative control may be out-of-band.

By way of the CoS attribute 201, application developers can provide customers with Crypto API clients 156 that when executed on an HSM App 171 on the HSM 101 have the ability to request different service levels for different crypto services, including at the hardware level, on the HSM 101. As one example, a payments customer (such as a bank or acquirer) can request a higher CoS for time sensitive operations such as PIN/CVC validation. Personal Identification Number (PIN)/Card Verification Code (CVC) validation operations require a fast response as defined by the credit card network to improve in-store responses at the point of sale terminals. Payments end users such as the Issuing Bank, Acquirer and ultimately the Card Holder will see better response times. As another example, a general purpose (GP) customer can request higher CoS for more frequent Signature Verification requests over less frequent Key Generation requests, which establishes a more efficient use of HSM/vHSM resources than on a first come first serve basis. Custom load balancing software (outside the HSM) can be based on the CoS attribute 201 to balance/distribute requests within a pool of HSMs/vHSMs.

Figure 2:
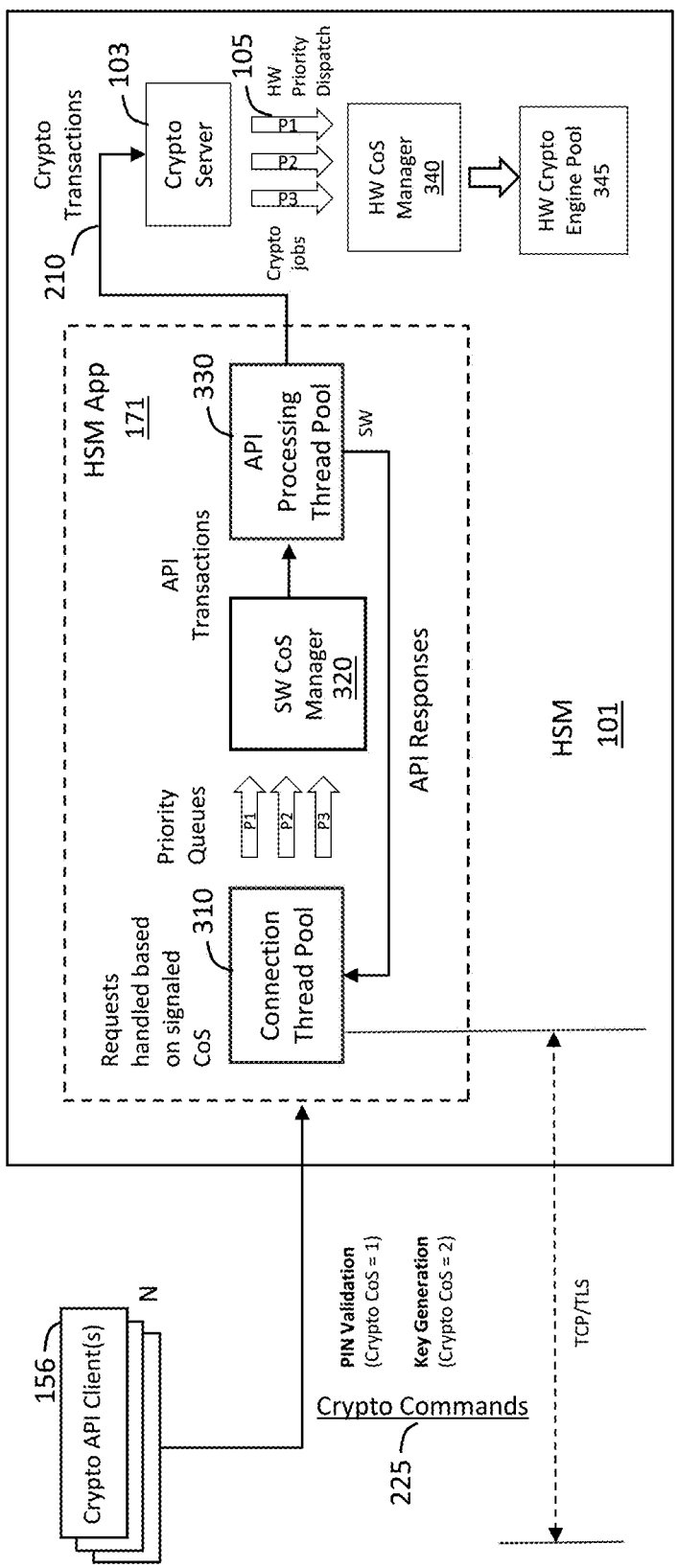
FIG. 2 illustrates an HSM Application (App) running on an HSM to handle crypto commands from one or more Crypto API Clients leveraging hardware prioritization in accordance with an embodiment.

FIG. 2 illustrates an exemplary HSM Application (App) 171 running on an HSM 101 to handle crypto commands 225 from one or more Crypto API Clients 156 leveraging the CoS attribute 201 for prioritizing hardware acceleration of cryptographic transactions associated with those commands 225. The HSM 101 is the hardware security module that provides cryptographic services via custom or standard cryptographic API. The HSM may be one of a general purpose (GP) HSM or a Payment HSM as previously mentioned. The GP HSM provides for digital signatures, encryption, decryption and verification & validation of a digital identify. The Payment HSM provides for PIN management, key management, card services, card validation, credentials, and payment processing transactions. The HSM App 171 is software that runs as computer instructions on a hardware processor within the HSM 101 for its operation.

The Crypto API Client 156 is a software entity that the HSM 101 or a virtual (vHSM) customer deploys to utilize the cryptographic services provided by the HSM/vHSM. This client 156 sends cryptographic commands 225 to the HSM/vHSM over the secure communication channels mentioned above (e.g. secured by TLS). Understandably, a customer may deploy multiple API clients 156 to suit their various needs. As one example, the API is associated with a Product Software Development Kit that conforms to the Public-Key Cryptography Standards #11 (PKCS #11). In this example, the Crypto API Client sends API requests that include crypto commands 225 directly to the HSM App 171 related to issuance of a PIN validation command, and separately related, a Key generation command (e.g. create an RSA or ECC key). Within each API, the Crypto API Client 156 can signal a certain Class of Service (CoS) with a range from 1 thru 3 (1 being the highest CoS level) for those crypto commands 225. In one arrangement, the in-band signaling for the Crypto API Client 156 is by way of a RESTful URI parameter request, or a customer header, or a gRPC field entry. The approach to signal CoS within each API request depends on the type of API such as REST, gRPC or custom binary/text-based:

REST: Via a custom Request URI parameter: "crypto-cos=" or Via a custom Header: "X-Crypto-CoS:"
gRPC: Via a custom "crypto_cos" field
Custom binary-based: Via a custom "crypto_cos" field As illustrated, the crypto commands 225 (e.g. PIN validation, Key generation) are received on the HSM 101 by a connection thread pool 310. The requests will be handled based on the in-band signaled CoS 201. The Connection Thread Pool 310 is a pool of processing threads that terminate the secure communication channels/connections. Each thread performs the following processing: i) terminates the TCP or TLS network connections, ii) performs basic validation of the API request received over the connection, and iii) processes the CoS level signaled in the request. Based on the CoS level, each thread creates an API Transaction for the request and posts it one of the three priority queues, P1 thru P3, associated with each of the three CoS levels. If the CoS level is not present in the request, it posts the request to P3 priority queue.

The SW CoS Manager 320 processes the API Transactions in the priority queues (P1-P3) using a scheduler, for example, but not limited to, weighted round-robin scheduling, and forwards the transaction to the API Processing Thread Pool 330. The API Processing Thread Pool 330 is a pool of threads that actually process the API request and generates the necessary crypto transactions. Each API Processing Thread in the pool 330 performs the following actions for each API Transaction of a crypto API client 156: i) complete validation of the API request, ii) authenticate the request if needed, iii) verify authorizations, iv) access keys and v) establish the crypto operations/jobs for the crypto transactions associated with the request. If the established crypto operation does not require hardware cryptographic resources for acceleration, the crypto operation specified in the transaction is executed in software as a software (SW) API response.

Alternatively, when the SW CoS Manager 320 determines that a crypto command 225 requires hardware cryptographic resources, it goes instead to the hardware (HW) path, where it generates Crypto Transaction(s) to the Crypto Server 103 with the same CoS level that was in the API transaction. As one example, longer key types (symmetric, asymmetric, RSA, ECC, etc.) and key lengths (1024, 2048, 4096, etc.) typically are a significant performance issue. Accordingly, the CoS manager 320 may delegate crypto transactions associated with certain types and longer key lengths in accordance with a hardware prioritization. Similarly, they may weight and delegate HW priority dispatches in the round-robin cycle for asymmetric crypto key transaction (done in HW) over symmetric keys (done in SW). The Crypto Server 103 processes the Crypto Transactions, and posts those crypto job transactions to the HW priority dispatch queue 105 also corresponding to the CoS level set in each of the crypto transactions. The CoS Manager 340 processes these Crypto Transactions in the priority queues via a scheduler, for example, using weighted round-robin scheduling, and forwards the transactions to the HW Crypto engines 345.

Figure 3A:
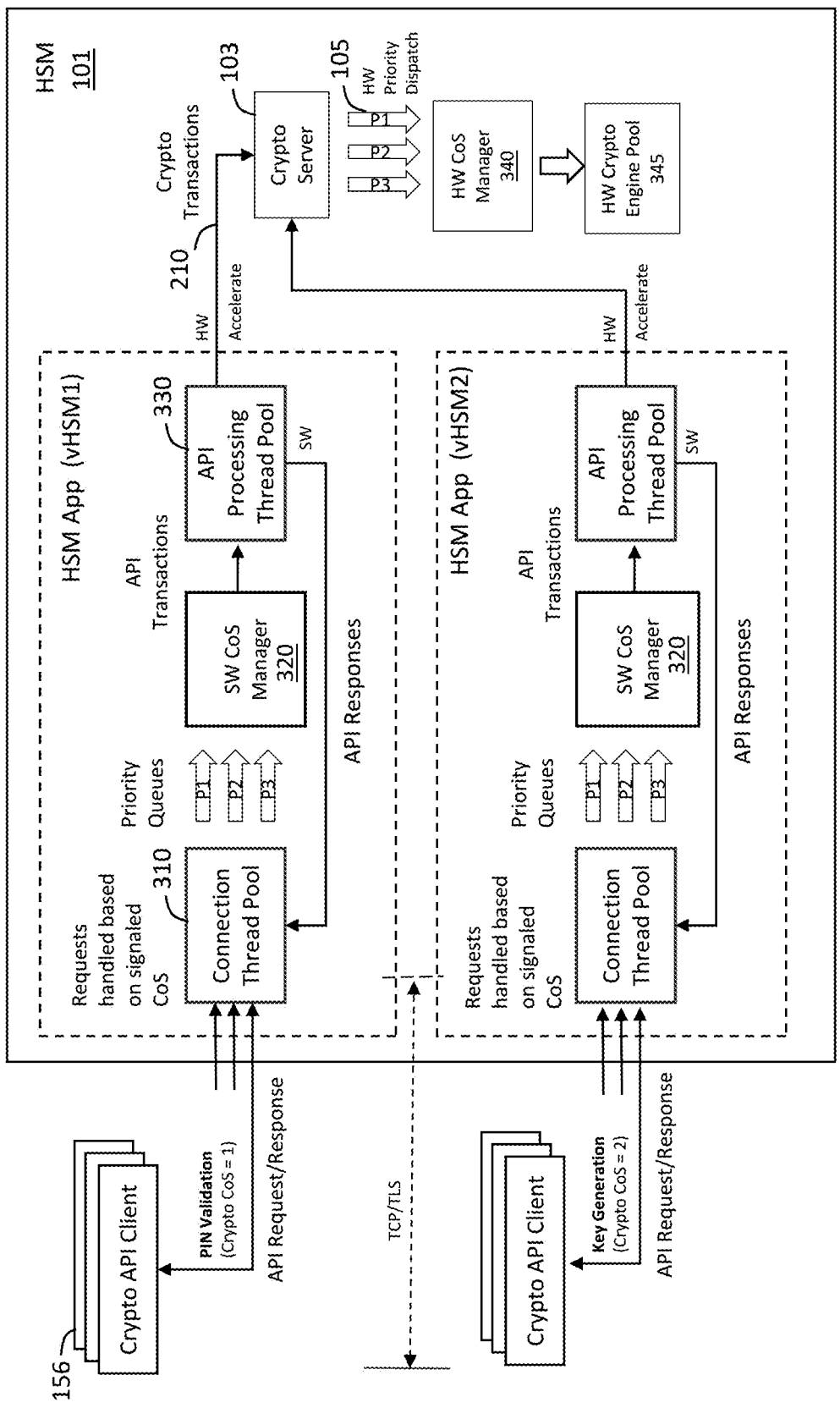
FIG. 3A is a block diagram of multiple tenants (vHSMs) running on one HSM to handle crypto commands from one or more Crypto API Clients individually leveraging hardware prioritization by way of a Class of Service (CoS) attribute in accordance with an embodiment.

FIG. 3A is a block diagram 300 of multiple tenants (vHSMs) running on one HSM to handle crypto commands from one or more Crypto API Clients 156 individually leveraging hardware prioritization by way of a Class of Service (CoS) attribute 201 in accordance with an embodiment. Multi-tenant HSM architectures are gaining popularity with robust performance at lower costs to handle multiple clients within the same HSM. In a cloud deployment, a single HSM may support multiple client applications, which is known as multi-tenancy.

Multi-tenant HSM architectures offer certain advantages: easier integration and management, load balancing across clusters, dedicated security configurations, and legal compliance. Some HSM platform models in the cloud support multi-tenancy on virtual clustered multi-processing enabled systems. Clusters can contain multiple HSMs, spread across multiple availability zones in a local region, wherein HSMs in a cluster are automatically synchronized and load-balanced. One direct benefit of an HSM that supports multi-tenancy is that one may create a virtual HSM as a partition for each virtual HSM guest that processes cryptographic traffic. One concern with hosting multiple tenants across virtual applications on a same virtual HSM is ensuring that concurrently running applications on the same or different processors are efficiently allocated hardware acceleration resources.

Figure 3B:
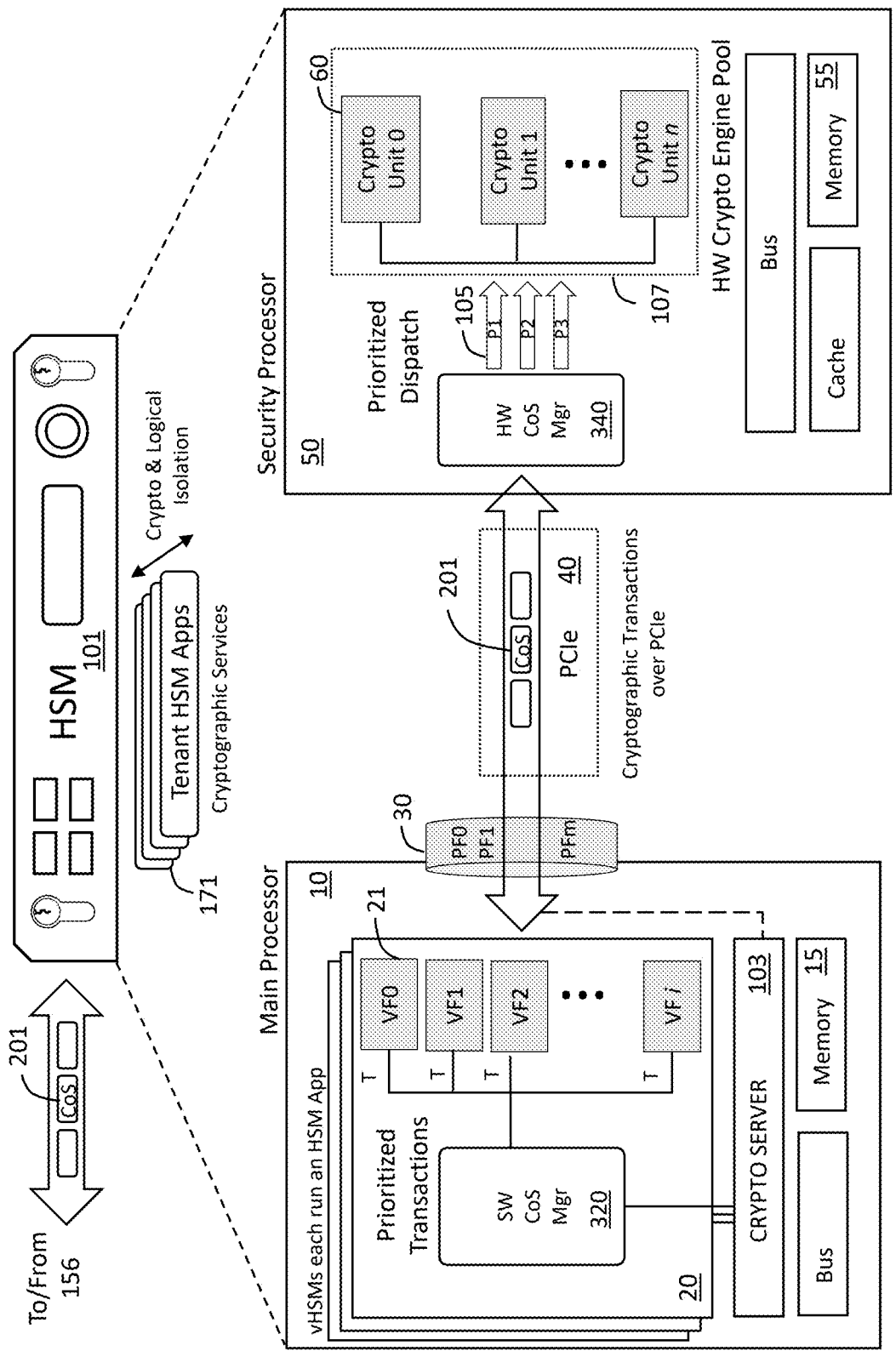
FIG. 3B is a more detailed block diagram of FIG. 3A for showing in-band CoS signaling interaction between HSM hardware components of a main processor and security processor in accordance with one embodiment.

FIG. 3B is one embodiment where the Hardware Security Module (HSM) 101 exposes the API 170 to establish a Class of Service (CoS) 201 on cryptographic transactions 210 requested from at least one Crypto API Client 156. When referring to FIG. 3B, reference may be made to components or features of the previous figures, where like numerals and numeric labels are carried over. The HSM 101 comprises a Main Processor 10 hosting an HSM app 171 exposing said API 170 to said at least one Crypto API Client 156, the API 170 providing a first API method to handle a Class of Service (CoS) attribute 201 of the at least one Crypto API Client 156 via in-band signaling for a desired cryptographic service, and a Security Processor 50 specialized to accelerate processing of said cryptographic transactions 210 in hardware (HW) on the HSM 101 based on of the Class of Service (CoS) attribute 201. The Security Processor 50 is communicatively coupled to the Main Processor 10 over a secure PCIe communication channel 40 internal to the HSM 101. The CoS attribute 201 signals a higher level of service for time-sensitive and high priority requests processing the cryptographic transactions on the HSM 101.

The Main Processor 10 comprises a software (SW) CoS Manager 320 to logically prioritize and queue the API requests from various connection threads in the Connection Thread Pool 310 that terminate TCP/TLS connections 120 to API processing threads in an API processing thread pool 330, whereby each API processing thread is assigned to handle the cryptographic transactions 210 associated with said desired cryptographic service, and determine from the CoS attribute 201 and the cryptographic transactions 210 whether to fulfill the cryptographic transactions in software on the main processor 10 or via hardware prioritization via the Security Processor 50. The Security Processor 50 comprises a hardware (HW) CoS Manager 340 at a hardware crypto transaction level to dispatch said hardware prioritization to one or more Crypto Units 60 thereby providing a HW Crypto Engine pool 107 to fulfill the cryptographic transactions 210 in hardware on the Security Processor 50.

FIG. 3B illustrates a Hardware Security Module (HSM) for hosting multiple tenants and showing in-band CoS signaling interaction between HSM components for improving crypto processing performance. Within the HSM 101 are two processors: a main processor 10, also referred to as a host, and a security processor 50, also referred to as a cryptographic co-processor. Here, the main processor 10 is virtualized to provide multiple virtual HSMs (vHSMs) each with their own HSM app 171 for handling cryptographic transactions 210 for multiple Crypto API Clients 156. A virtual HSM is a secure execution environment hosted on a physical HSM that provides specific cryptographic services. Each physical HSM would typically host multiple vHSMs depending on the available cryptographic capacity on the physical HSM. Each vHSM may provide specific services associated with a specific cryptographic application such as General Purpose Crypto or Payments Crypto application. Each vHSM is typically assigned/allocated specific set of CPU cores of the main processor.

The security processor 50 may be in the form of an Application Specific Integrated Circuit (ASIC), and Field Programmable Gate Array (FPGA) or other hardware based cryptographic accelerator. The security processor 50, including its one or more Crypto Units (CU) 60, is optimized for Public Key Infrastructure (PKI) algorithms such as RSA, Diffie Hellman, and Elliptic Curve Cryptography (ECC), which serve as the basis of digital signature and key exchange protocols that make secure transactions possible between not only the main processor 10 and security processor, but also the main processor 10 and any client/tenant application running on the HSM and communicating with other servers or computers on the network.

If there are no vHSMs (as shown in FIG. 2), the physical HSM 101 is typically dedicated to provide either General Purpose Crypto or Payments Crypto applications through the API 170. The HSM App 171 establishes this functionality. The main processor 10 of the physical HSM will execute certain functionality: 1) Connection thread pool, 2) Priority Queues, 3) CoS Manager, 4) API processing thread pools, 5) Crypto Server, 6) Hardware Crypto CoS Manager, and 7) Hardware crypto drivers. If there are vHSMs (as shown in FIG. 3A-3B) the following modules are executed within each vHSM to execute the functionality: 1) Connection Thread Pool 310, 2) Priority Queues, 3) SW CoS Manager 320, and 4) API Processing Thread Pool 330. Here, the following modules execute outside of the vHSM and are common to all vHSMs on the system: 1) Crypto Server, 2) Hardware Crypto CoS Manager 340, 3) Hardware crypto drivers, and 4) HW Crypto Engine Pool 345. This helps it achieve better performance level for higher volume traffic requiring more connections per second (higher transaction throughput), for example, using the integrated public key infrastructure (PKI) acceleration that requires application delivery controllers, network admission control appliances and remote access gateways that otherwise introduce a performance bottleneck.

The main processor 10 includes one or more virtual functions (VF) 21. Virtualization allows an HSM administrator to take advantage of underutilized physical hardware by running more than one virtual machine (VM) on the main processor 10. The Main Processor (MP) 10 incorporates more than one Virtual Function (VF) 21, each providing cryptographic services over more than one Peripheral Component Interconnect Express (PCIe) Physical Function (PF) 30 to the Security Processor (SP) 50, The main processor 10 responds to and supports the cryptographic services over the PCIe communication channel byway of one or more Crypto Units (CU) 60 thereon communicatively coupled to the more than one Peripheral Component Interconnect Express (PCIe) Physical Function (FP) 30. The main processor 10 is communicatively coupled to the security processor 50 over a PCIe link 40 by way of the multiple Ethernet ports to the one or more Physical Functions 30. The PCIe link 40 is securely shared across the one or more multiple Virtual Functions (VF0, VF1 . . . VFi) 21.

In one arrangement the VFs 21 are logical processors assigned to a VM by the SW CoS Manager 320, which is effectively a thread scheduler. Each VF 21 is a single virtual processor to schedule a single thread to run at a time, and therefore, use at least one of the Central Processing Units (CPUs) on the main processor 10. By way of the SW CoS Manager 320, each VF 21 can support at least one single Input/Output (10) resource to a corresponding physical function (PF) 30 of the PCIe link/interface 40. Once the main processor 10 is configured for virtualization it can thereafter enable its respective physical functions (PFs) 30 wherein each virtual function 21 can access the PCIe configuration space of the PF 30 by was of a bus, device, and function number of the physical function. Each virtual function 21 has a PCI memory space, which is used to map its register set. Each virtual function (e.g. VF0, VF1 . . . VFi) 21 is a device driver that operates on the register set to enable its functionality, where the virtual function 21 appears as an actual PCI device.

The Physical functions 30 (e.g. PF0, PF1, . . . PFm) are fully featured PCIe functions that by way of the SW CoS Manager 320 can be discovered, managed, and manipulated like any other PCIe device. Physical functions 30 can be used to configure and control a PCIe device. Each PF 30 can however be shared by many VFs 21, or corresponding virtual machines. Briefly, a virtual function is a lightweight PCIe function that shares one or more physical resources with the physical function and with virtual functions that are associated with that physical function. Unlike a physical function, a virtual function can only configure its own behavior. The shared PF 30 PCIe devices provide dedicated resources and also use shared common resources. In this way, each VF 21 has access to unique resources of the main processor. Therefore, a PCIe device, such as an Ethernet port, that is single root Input/output (10) virtual-enabled with appropriate hardware and Operating System (OS) support can appear as multiple, separate physical devices, each with its own PCIe configuration space.

In a general use case, the main processor 10 drives a Physical Function 30 and multiple Virtual Functions 21 over the PCIe link 40 to the security processor 50 for handling crypto requests by way of the SW CoS Manager 320 and HW CoS Manager 340, aiming at providing cryptographic services to multiple customers by way of the crypto API app 156; each a tenant on the HSM. The HSM by way of the SW/HW CoS Managers 320/340 handle cryptographic service requests for each tenant independently from the other. The tenants are isolated from one another with improved side channel protection, whereby tenant applications on the same or different processors do not have access to another application's data, memory, processes or other sensitive information.

The crypto units 60 are independent crypto hardware accelerators responsible for Public Key Hardware Accelerators (PKHA) to support the various key lengths and routines required by the HSM; including, but not limited to, Elliptic Curve Cryptography (ECC) over prime and binary fields, DSA signing, DSA verification, Modular operations (add, subtract, multiply, exponentiation, reduction, inversion, point add, point multiply, Montgomery ladder operations, divisor and primality tests, Random Number Generation (RNG), Advanced Encryption Standard algorithms, and digest operations (hashes, SHA, MD5, HMAC, etc.).

Although not shown, the security processor 50 by way of the HW CoS Mgr 340 may include job queue and descriptor controller functions for the respective Crypto Units 60, along with typical System on a Chip (SoC) functions/hardware: including, but not limited to, memory 55, DDR, SRAM, L1/L2 Cache, Flash, and multiple Ethernet physical ports. Descriptors are added to differentiate secure and non-secure data, which allows for latency reduction by only encrypting keys/sensitive data, and allows for storage of encrypted key on the main processor 10. In one embodiment as a SoC, the security processor 50 is an integrated circuit (IC) that takes a single platform and integrates an entire electronic or computer system for crypto algorithms and operations onto it.

The PCIe Channel 40 between the MP 10 and SP 50 provides cryptographic and logical isolation between multiple tenant applications on the HSM individually using and sharing said more than one PCIe PF 30 over said more than one Virtual Function (VF) 21 to the one or more Crypto Units (CU) 60 for satisfying a request of said cryptographic services. As noted ahead, the requests may be in the form of packets (including the CoS attribute 201) communicated between the main processor 10 and security processor 50. The main processor 10 may also include a bus, a memory 15, and a cache for storing encryption data, sensitive information, or keys. Notably, the encrypted data (d0, d1 . . . di) can be saved in memory 15 on the main processor 10. Similarly, the security processor 50 includes a bus, a memory 55, and a cache for storing encryption data, sensitive information, or keys as shared or independent components.

The General Processor (GP) CPU of MP 10 can mix secure and non-secure data within the same request for a crypto command according to the CoS attribute 201; for example, if a transaction is more efficiently delegated to a non-secure path between MP 10 and SP 50. In the header of the packet, the GP CPU indicates which data and commands are associated with CoS attribute 201, so that an Crypto Unit assigned by the HW CoS Mgr 340 respectively handles the received data and command. It can be mixed with non-secure channel for performance optimization. For example, computation and power consumption for certain crypto command requests (e.g. signing, verification, etc.) may be assessed as parameters on the non-secure channel and compared to corresponding parameters on the secure channel to optimize data loads and respective data encryption performance.

Figure 4:
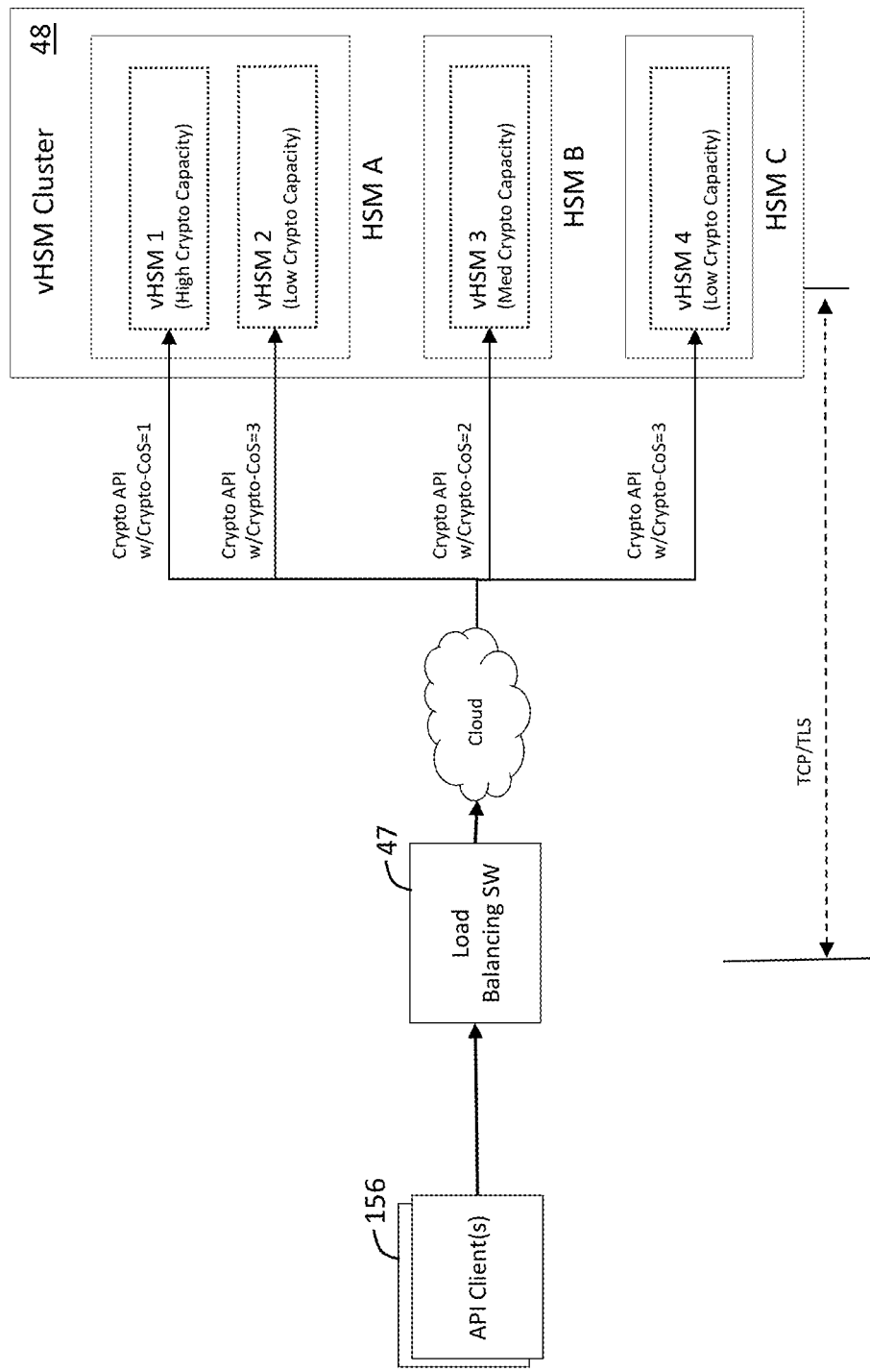
FIG. 4 depicts a use case scenario for load balancing across a vHSM cluster by way of the Class of Service (CoS) attribute for a pool of HSM modules in accordance with the embodiments.

FIG. 4 depicts a use case scenario 400 for load balancing across a vHSM cluster 48 by way of the Class of Service (CoS) attribute for a pool of HSM modules in accordance with the embodiments. The one or more Crypto API Clients 156 allow for a client to set (manual or automatic) the CoS in the respective API 170. The cloud load balancer 47 is an optional software component involved in the cryptographic API processing path. It operates with the users via API requests, including the CoS attribute 201. Customers sometimes choose to use custom load balancing software on the client side to distribute/balance load across a pool/cluster of HSMs/vHSMs and for high-availability purposes. The load balancer receives the API from the clients and use custom algorithms to distribute the requests to different HSMs/vHSMs.

The load balancer 47 (local or cloud) reads the CoS signaled by the client in the CoS field 201 to prioritize and balance the load across a "vHSM Cluster" 48 (with different crypto processing capacities) across a pool of HSM modules (e.g. A, B, C). Here, it is assumed the individual vHSMs provide different processing capabilities (HW acceleration, CU 60 thread management) and capacity (e.g. throughput; MB/s), both configurable, for example: low, medium, high (performance, priority, etc.). For example, a first API client 156 through the load balancer 47 along the top path sets CoS=1 and is allocated a high crypto capacity on vHSM 1 of HSM A. A first API client 156 through the load balancer 47 just below the top path sets CoS=3 and is allocated a low crypto capacity on vHSM 2 of HSM A. In that same vHSM cluster 48, another API client 156 through the load balancer 47 along the middle path sets CoS=2 and is allocated a medium crypto capacity on vHSM 3 of HSM B.

The cloud load balancer 47 consumes and produces data that comes in via various applications and API gateways that also generate logs and other user and network environment related information. The information exchanged via the API along with the respective service uses can be analyzed, and with respect to network information, available through logs reporting various activities, including, but not limited to, load balancing. The cloud load balancer 47 is a fully distributed, software-defined managed service that distributes user traffic and tasks across multiple instances of applications. By spreading the load, it reduces the risk that any particular application experiences limited performance issues. It can optimize the network response time and avoid unevenly applications overloading.

Figure 5:
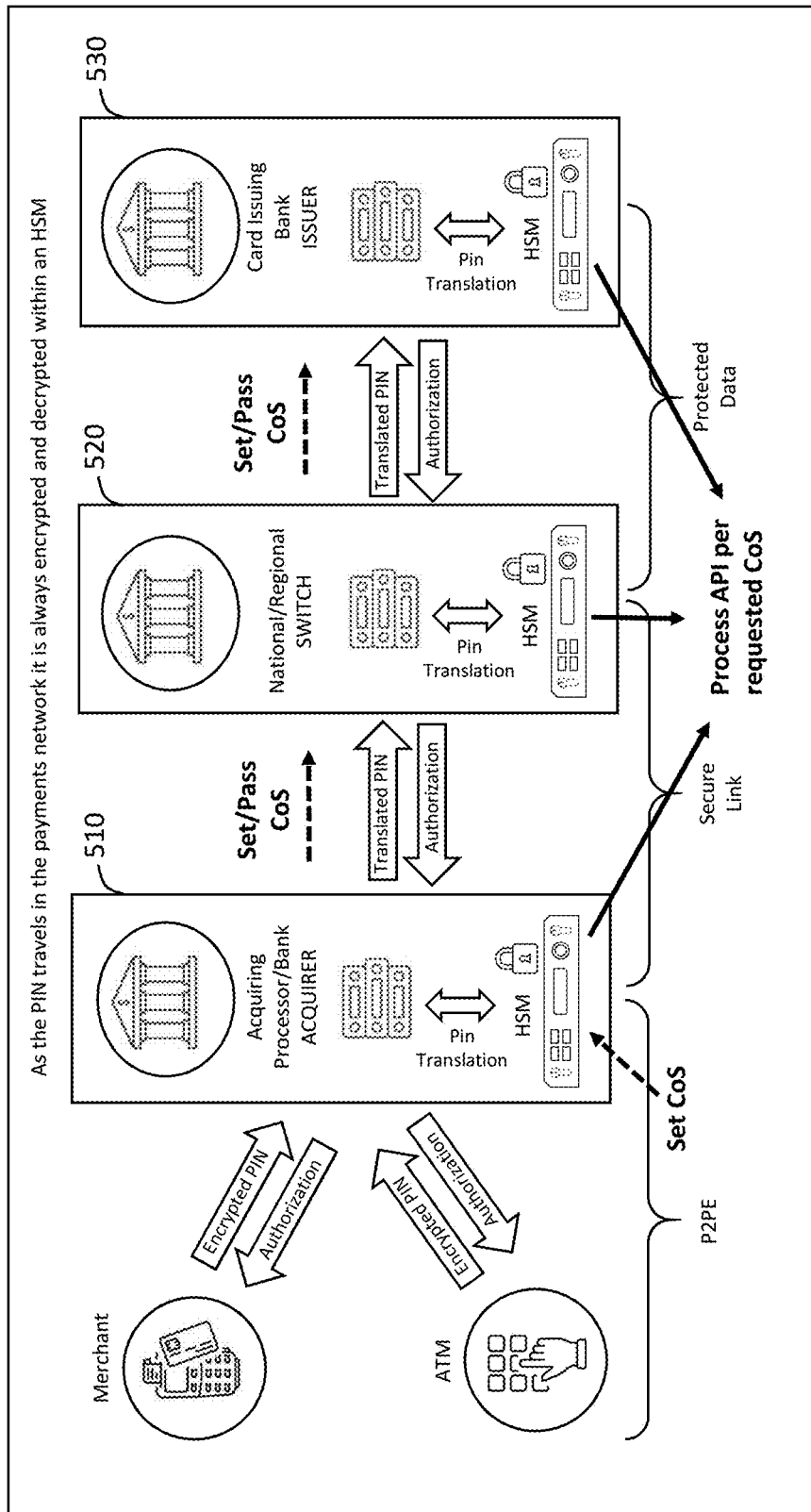
FIG. 5 depicts intermediate nodes of a Payments Network providing HSMs and their role for cryptographic transaction support in accordance with an embodiment.

FIG. 5 depicts intermediate nodes of a Payments Network 500 for provisioning and providing customer HSMs, and their role for cryptographic transaction support. As shown, HSMs may reside at any one or more of the nodes in the payments network: Merchant, Acquirer, Switch and Issuer. HSMs are provisioned and connected directly to customer network, and the HSMs are under the customer's sole administration control. Under normal conditions, HSM (Payments or GP) customers currently do not have the ability to request different levels of service for any cryptographic workloads.

Advantageously, by way of the application level crypto API client 156 configured with the CoS attribute 201, any intermediate processing entity (nodes: Merchant, Issuer, Acquirer) can also utilize the signaled CoS in each request to distribute the payments requests to different Payment HSM or vHSM in a farm/estate. This includes application of the custom load balancing 47 application previously described. Any intermediate node(s) in the entire network path can prioritize the crypto API according to the requested CoS 201 such that every HSM 101 (or any vHSM therein configured for CoS) would allocate the necessary resources to fulfill the requested CoS.

The Application Programming Interface (API) 170 establishes the in-band Class of Service (CoS) on cryptographic transactions 210 in the Hardware Security Module (HSM) 101 that by way of the CoS in-band signal provides for hardware prioritization performance improvement requested by a crypto API client 156. Notably, each node of the network 500 may have its own crypto API client 156 (e.g. Merchant client, acquirer client, issuer client). To achieve that, a first API method handles a Class of Service (CoS) attribute 201 on at least one Crypto API Client 156 via in-band signaling for a desired cryptographic service, where the CoS attribute 201 signals a higher level of service for time-sensitive and high priority requests processing the cryptographic transactions on the HSM 101. A second API method administers controls of the CoS attribute 201 over the Crypto API Client 156 via in-band signaling, whereby administrators are authorized to explicitly control the CoS as a feature on a per-client basis for each said at least one Crypto API Client. A third API method—appropriates pricing and licensing features of the CoS attribute 201 for the at least one Crypto API Client via in-band signaling.

A fourth API method propagates the CoS attribute 201 for the at least one Crypto API Client 156 to intermediate nodes (510, 520, 530) in the network path (e.g. payments network 500) involved in processing the cryptographic transactions across multiple HSMs. The intermediate nodes (510, 520, 530) support a card scheme for a payment network and a node therein is one among: a payments merchant, a payments acquirer, a payments switch, and a payments issuer. A fifth API method configures the CoS attribute 201 on a general purpose (GP) HSM and a Payment HSM. The GP HSM provides for digital signatures, encryption, decryption and verification & validation of a digital identify. The Payment HSM provides for PIN management, key management, card services, card validation, credentials, and payment processing transactions.

In this example, a PIN validation command is considered because it entirely propagates through all nodes of the payment network 500. It starts at the Merchant, where the user's PIN is first encrypted, for example, on a Point of Sale (PoS) terminal at the store responsive to a sale where the user inserts their card. Alternatively, if the user is at an ATM, for example, to withdraw money, the PIN is encrypted and transaction data sent to Merchant's host application for cryptographic processing. Each crypto transaction associated with the PIN validation request requires some form of authorization. Recall, the CoS attribute is set by way of a respective crypto API client 156. In one embodiment, the CoS attribute 201 includes an authorization node entry that adjusts the CoS level at a particular node if authorization is approved at that node; for example, to allocate more or less HSM HW resources.

At each node, a PIN translation is performed, which is a form of encryption. The user's PIN is passed on from PoS to the Acquirer (e.g. a bank), to payment scheme and finally to the issuing bank which is the only instance node that can verify if the PIN is correct. To validate the user's PIN, the issuer has to use two type of keys the Issuer working key or zone pin key (IWK/ZPK) and pin validate keys (PVK) both are available at issuer's database encrypted under local master keys (LMK) of the HSM. While traveling through all these instances, the PIN will be encrypted by each HSM, the CoS attribute 201 will be evaluated, set (for local processing) and passed onward (for other nodes to process), and at each instance node the encryption will change to ensure the necessary degree of security. Each node stores and manages its own keys on its HSM but will interact with the HSM according to the CoS attribute 201 (e.g., level 1-3, authorization, etc.)

Payment HSMs are an essential element of security in the payments system, and their use in payments and PIN processing is mandated by Payment Card Industry (PCI) and must be certified to PCI security standards. On that point, one of the overheads and time costs in maintaining an HSM cloud service is maintaining up-to-date PCI compliance and capability to securely and efficiently handle transactions associated with card processing fees. For example, the encryption from PoS to acquiring bank uses a key called ZPK (Zone PIN key). This key is generated based on the ZMK (Zone Master Key). The ZMK key translation is known to both PoS and acquiring bank so they are able to exchange and decrypt the ZPK. Notably, the security standards met by each node are also different. Each HSM in the payments network is configurable with the CoS attribute 201, and may be used to generate, manage and validate the PIN, to recharge the card, to validate the card, user and cryptogram during payment transaction processing, to share keys securely or to issue payment credentials for payment cards and mobile apps.

FIG. 6 is an exemplary table 600 showing number of crypto transactions handled in the HSM based according to Class of Service (CoS) in accordance with an embodiment. For example, with a CoS of 1 (high priority) for both vHSM1 and vHSM2, each performs about the similar number of Encrypt and Decrypt crypto operations, respectively, 2540 and 2600. Adjusting the CoS to 2 (medium priority) for the Verify command (cryptographic signature verification) results in a slight performance improvement of vHSM1 for number of crypto operations (121) compared to vHSM2 (103); namely crypto transactions per second will increase where hardware acceleration is processing commands with a greater priority. As an another example, adjusting the CoS to 1 (high priority) for the Sign command (cryptographic signature generation) results in significantly higher performance improvement of vHSM1 for number of crypto operations (81) compared to vHSM2 (42); On this point, it should be noted that a crypto command (e.g. Key Generate) at the application level includes one or more associated crypto transactions at the hardware level which are individually prioritized by way of the CoS attribute 201.

Figure 7:
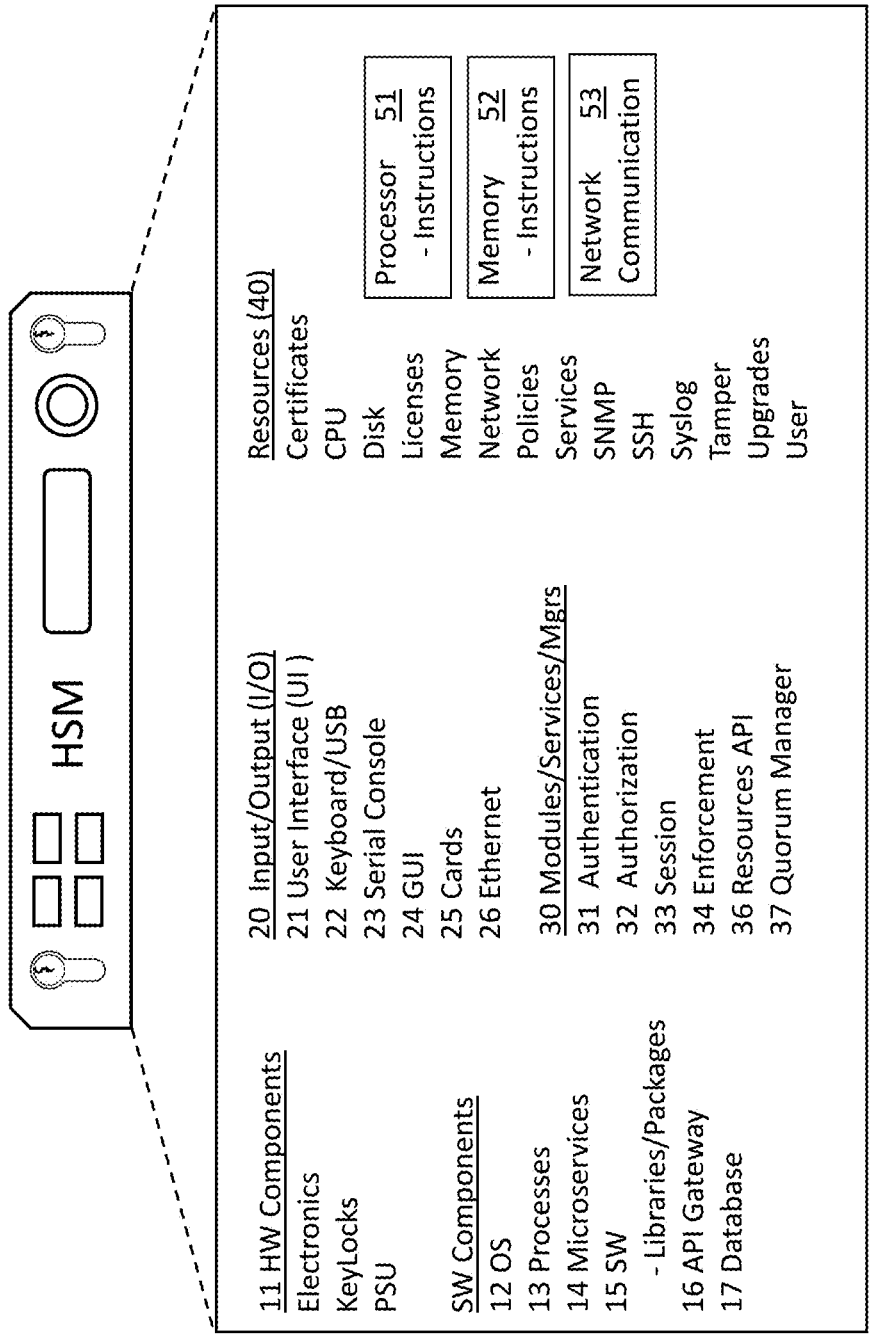
FIG. 7 depicts exemplary components of a Hardware Security Module (HSM) in accordance with one embodiment.

FIG. 7 depicts exemplary components of the Hardware Security Module (HSM) 700 in accordance with one embodiment. The HSM 700 (see also 101 in FIG. 1) is a physical computing device that, among other capabilities, safeguards and manages digital keys, performs encryption and decryption functions for digital signatures, and provides for strong authentication and other cryptographic functions. As a security hardened unit, the HSM 101 records tamper evidence, such as visible signs of tampering or logging and alerting, and provides for tamper responsiveness such as deleting keys upon tamper detection. The HSM 101 contains one or more secure cryptoprocessor and sensor chips to prevent tampering and bus probing, or a combination of chips in a module that is protected by the tamper evident, tamper resistant, or tamper responsive packaging.

The HSM 700 is in effect a computer system comprising one or more processors 51 and memory 52 coupled to the one or more processors, wherein the memory 52 includes computer instructions which when executed by the one or more processors causes the one or more processors to perform the operations of the methods described herein. The HSM may be connected over the network to other machines via the network communication device interface 53. The HSM may be installed in the backplane of a server. The HSM may be connected via an interface (e.g. universal serial bus) to a server. In a networked deployment, the machine may operate in the capacity of a server or a client user machine in server-client user network environment, or as a peer machine in a peer-to-peer, or distributed, network environment.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the machine-readable memory 52 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

Operational use of the (GP or Payment) HSM 700 for establishing an End to End (E2E) trusted HSM setup with Class of Service (CoS) priority using the methods described above is primarily by way of the components shown in the figures, but understandably, many more components, electronics, and modules are present in a typical HSM. Those components shown are those mostly related, and suitable for use, for implementing the foregoing inventive methods. Hardware (HW) components 11 represent general electronics for operating the HSM (e.g., processors, central processing units, security, sensors, memory, network devices, ports, power supply units (PSU), wires, keylocks, etc.). The Hardware also contains memory to run operating system and input-output (I/O) devices for interaction. It comprises different types of processors, such as a crypto processor, security processor, general processing unit (GPU), central processing unit (CPU) to assist in protection, management of keys and hardware acceleration with the operating system. The keys, or any other data, can be stored in the database for persistence. The hardware architecture is designed to protect and manage digital keys, and can perform encryption, decryption, digital signature generation and verification.

In one embodiment, the aforementioned (GP or Payment) HSM 900 functionality and methods for the End to End (E2E) trusted HSM setup is configurable as a microservice. The customer configuration file is exposed via a microservices API for End to End (E2E) trusted HSM setup using the trusted device. Microservices are independent and lightweight processes designed to perform specific tasks. They are typically handled and managed within the HSM by way of the OS 12. Microservices 14 can communicate with each other and with external systems over specialized protocols and application programming interface (API) 16. Micro service are built using software libraries/packages 15, which are a self-contained set of independent and interchangeable software component that implement a specific functionality. Microservices 14 and Processes 13 are built using these software libraries/packages 15. By way of these microservices, applications can implement a third-party Microservice provider's generic API to a service to deliver Payment HSM capabilities. In this manner, for example, a $3^{rd}$ party customer by way of APIs can partition their workload to optimized payment HSMs for performing specific tasks (e.g. ECC/RSA key gen, PIN translations, etc.) according to their microservice model. As another example, a microservice with a customer facing API for an End to End (E2E) trusted HSM setup using the trusted device is contemplated. The API can include options allowing the customer to configure trust anchors and certificate chain management for generating and programming the secure content (e.g. IP addresses for network configuration setup) on their workstations and HSM cluster within the protected environment.

The Operating System (OS) 12 is a software component that executes on top of hardware, for example, the general processor, to manage hardware resources and peripherals, run HSM jobs/processes, and help in execution of other processes 13. Ubuntu is an exemplary OS that provides an embedded Linux distribution with libraries and packages. Ubuntu (GNU/Linux) is a multitasking Operating System capable of executing several processes (tasks) simultaneously. Different processes 13 for performing the HSM functions (data protection, key management, pin translations, etc.) are scheduled by the operating system 12. A thread is the basic unit to which the operating system allocates processor time. A process 13 is an instance of a computer program that is executed by one or many threads in the GPU or CPU. One or more threads run in the context of the process. A thread can execute any part of the process code, including parts currently being executed by another thread.

In another embodiment, an API 16 is provided for End to End (E2E) trusted HSM setup when configured as a microservice. The API can be a RESTful API using HTTP requests to produce and consume data related to network configuration services via at least one of a GET, PUT, POST, PATCH and DELETE command type. The API includes a command set for each stage of warranting, commissioning, and provisioning the HSM during initial set-up and for life-cycle HSM management, including but not limited to certificate management at each stage.

The Application Programming Interface (API) 16 provides a connection between computers or between computer programs/applications, and/or between computers and people. It is a type of software interface, offering a service to other pieces of software. The API provides a communication channel between HSM components, internal processes 13 and/or micro services 14. These APIs are exposed on top of input/output (I/O) 20 interfaces. External systems and/or people communicate with HSM via the I/O interfaces 20, such as a basic user interface (UI) 21, or more sophisticated graphical user interface (GUI) 24 The HSM can also communicate with external systems through hardware 10 interfaces, such as the keyboard 22, serial port 23, smart card 25, Ethernet 26, optical ports, USB ports, etc. External systems (host computers in a data center) can also talk to HSM software interface via APIs exposed on top of individual hardware interfaces (e.g., network device driver, disk/memory management, etc.).

The HSM includes a local console 23 that is serial connected over e.g., a USB-C interface. The serial interface can be used by operations personnel, namely operators, referred to as DCOps (standing for Data Center Operations), who have physical access to the HSM for manually issuing commands to the HSM. Such USB-C interface is used, for all configuration throughout the HSM service, including initial configuration and cumbersome provisioning processes. The HSM also includes managerial Graphical User Interface (GUI) 24 that over an Ethernet 26 connection allow for remote configuration of the HSM. Also, the I/O 20 can be used to configure network settings, TLS certificates, upgrades, licenses and devices (e.g. CPU, Disk, memory, etc.). Operator (Java) cards 25 also provide a means for provisioning and securing the HSM using key shares and key splits.

The HSM also includes services 30 by way of modules, processes and service managers. Some services may be internal to the HSM, and others may be selectively exposed via an API gateway 16 to external entities or services. Examples of services 30 include authentication 31, authorization 32, session manager 33, enforcement 34, resource API manager 36, and quorum manager 37. Accordingly, service managers can be invoked/managed/configured remotely (external) via their APIs, for example, from a web based GUI (e.g. payShield Manager) via Internet connection over Ethernet to the HSM.

The HSM also includes (internal) resources 40 which can be externally configured via the normal I/O interfaces 20, and also, for some, (internally and externally) via any of the module/service managers 30 and their respective APIs. Examples of HSM resources include, but are not limited to, certificates, licenses, policies, device management, services, upgrades and so on. Each resource 40 has a respective API for software modules, processes or microservices to interact with the respective resource. The HSM offers access and services to each resource 40 via the resources API 36. Aside from payment HSM related tasks (e.g. encryption/decryption, key management, etc.), this includes: certificate/license management, SNMP, TLS, memory management/configuration, network management/configuration, upgrade installations/services, user resources, and so on.

The architectural style for APIs is typically categorized as either being SOAP (former acronym for "Simple Object Access Protocol", but referring now to a "Service Oriented Architecture", SOA for Web services) or REST (Representational State Transfer), and both are used to access Web services. While SOAP relies solely on XML to provide messaging services, REST offers a more lightweight method, using URLs in most cases to receive or send information. REST uses different HTTP 1.1 verbs, also known as access "methods" to perform tasks. These methods are GET, POST, PUT, and DELETE, which refers to the reading, updating, creating and deleting of operations concerning objects or resources, respectively. Unlike SOAP, REST does not have to use XML to provide the response. Some REST-based Web services output the data in Command Separated Value (CSV), JavaScript Object Notation (JSON) and Really Simple Syndication (RSS). The advantage with REST is that the output needed can be obtained in a form that is easy to parse within the language of the application specifically concerned.

In the embodiments presented herein, REST offers an alternative to, for instance, SOAP as method of access to a web service. In order to be used in a REST-based application, a web service needs to meet certain constraints. Such a web service is called RESTful. A RESTful web service is required to provide an application access to its web resources in a textual representation and support reading and modification of them with a stateless protocol and a predefined set of operations. By being RESTful, web services provide interoperability between the computer systems on the internet that provide these services. RESTful APIs embody the rules, routines, commands, and protocols that integrate the individual microservices, so they function as a single application. In a RESTful web service, requests made to a resource's URL will elicit a response with a payload formatted in HTML, XML, JSON, or some other format. The response can confirm that some alteration has been made to the resource state, and the response can provide hypertext links to other related resources. When HTTP is used, the operations (HTTP methods) available can comprise: GET, POST, PUT, DELETE, PATCH, and/or OPTIONS.

In the embodiments presented herein, a general purpose Remote Procedure Call (gRPC) offers an alternative model to API design for access to a web service. In order to be used in a gRPC-based application, a web service needs to meet certain constraints. gRPC is a technology for implementing RPC APIs that uses HTTP 2.0 as its underlying transport protocol, but HTTP is not exposed to the API designer. gRPC is a robust open-source RPC framework used to build scalable and fast APIs. It allows the client and server applications to communicate transparently and develop connected systems. gRPC services and messages between clients and servers are defined in proto files. The Protobuf compiler, protoc, generates client and server code that loads the .proto file into the memory at runtime and uses the in-memory schema to serialize/deserialize the binary message. After code generation, each message is exchanged between the client and remote service. gRPC offers faster performance and API-security than REST+JSON communication as it uses Protobuf and HTTP/2.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed, is:

1. A Hardware Security Module (HSM) exposing an API to establish a Class of Service (CoS) on cryptographic transactions requested from at least one Crypto API Client, the HSM 101 comprising:
   a Main Processor hosting an HSM app exposing said API to said at least one Crypto API Client, the API providing:
      a first API method to handle a Class of Service (CoS) attribute of the at least one Crypto API Client via in-band signaling for a desired cryptographic service;
      wherein the CoS attribute signals a higher level of service for time-sensitive and high priority requests processing the cryptographic transactions on the HSM; and
   a Security Processor specialized to accelerate processing of said cryptographic transactions on the HSM 101 based on the Class of Service (CoS) attribute;
   wherein the Main Processor comprises a software (SW) CoS Manager to logically
      prioritize and queue the API requests from the connection threads in the Connection Thread Pool that terminate TCP/TLS connections to API processing threads in an API processing thread pool, whereby
      each API processing thread is assigned to handle the cryptographic transactions associated with said desired cryptographic service, and determine from the CoS attribute and the cryptographic transactions whether to fulfill the cryptographic transactions in software on the main processor or via hardware prioritization via the Security Processor,
   wherein the at least one Crypto API Client is communicatively coupled to the HSM over the TCP/TLS secure communication channel to an internet protocol (IP) address and port.

2. The HSM of claim 1, wherein the Security Processor comprises a hardware (HW) CoS Manager at a hardware crypto transaction level to dispatch said hardware prioritization to one or more Crypto Units thereby providing a HW Crypto Engine pool to fulfill the cryptographic transactions in hardware on the Security Processor,
   wherein the Security Processor is communicatively coupled to the Main Processor over a secure PCIe communication channel internal to the HSM.

3. The HSM of claim 1, is one of a general purpose (GP) HSM and a Payment HSM,
   wherein the GP HSM provides for digital signatures, encryption, decryption and verification & validation of a digital identify;
   wherein the Payment HSM provides for PIN management, key management, card services, card validation, credentials, and payment processing transactions.

4. The HSM of claim 1, wherein the main processor is virtualized to provide multiple virtual HSMs (vHSMs) each with their own HSM app for handling cryptographic transactions for multiple Crypto API Clients.

5. An Application Programming Interface (API) for establishing an in-band Class of Service (CoS) on cryptographic transactions in a Hardware Security Module (HSM) that exposes the API to establish a Class of Service (CoS) on cryptographic transactions requested from at least one Crypto API Client, the API comprising:
  a first API method to handle a Class of Service (CoS) attribute on said at least one Crypto API Client via in-band signaling for a desired cryptographic service;
  wherein the CoS attribute signals a higher level of service for time-sensitive and high priority requests processing the cryptographic transactions on the HSM;
  wherein the HSM comprises:
    a Main Processor hosting an HSM app exposing said API to said at least one Crypto API Client, and
    a Security Processor specialized to accelerate processing of said cryptographic transactions on the HSM based on the Class of Service (CoS) attribute;
  wherein the Main Processor comprises a software (SW) CoS Manager to logically
    prioritize and queue the API requests from the connection threads in the Connection Thread Pool that terminate TCP/TLS connections to API processing threads in an API processing thread pool, whereby
    each API processing thread is assigned to handle the cryptographic transactions associated with said desired cryptographic service, and determine from the CoS attribute and the cryptographic transactions whether to fulfill the cryptographic transactions in software on the main processor or via hardware prioritization via the Security Processor,
  wherein the at least one Crypto API Client is communicatively coupled to the HSM over the TCP/TLS secure communication channel to an internet protocol (IP) address and port.

6. The API of claim 5, further comprises a second API method to administer controls of the CoS attribute over the Crypto API Client via in-band signaling,
  whereby administrators are authorized to explicitly control the CoS as a feature on a per-client basis for each said at least one Crypto API Client.

7. The API of claim 6, further comprises a third API method to appropriate pricing and licensing features of the CoS attribute for the at least one Crypto API Client via in-band signaling.

8. The API of claim 6, further comprises a fourth API method to propagate the CoS attribute for the at least one Crypto API Client to intermediate nodes in a network path involved in processing the cryptographic transactions across multiple HSMs.

9. The API of claim 6, where the intermediate nodes support a card scheme for a payment network and a node therein is one among: a payments merchant, a payments acquirer, a payments switch, and a payments issuer.

10. The API of claim 6, further comprises a fifth API method for configuring the CoS attribute on a general purpose (GP) HSM and a Payment HSM,
  wherein the GP HSM provides for digital signatures, encryption, decryption and verification & validation of a digital identify;
  wherein the Payment HSM provides for PIN management, key management, card services, card validation, credentials, and payment processing transactions.

11. The API of claim 6, wherein said in-band signaling for said Crypto API Client is by way of a RESTful URI parameter request or a customer header.

12. The API of claim 6, wherein said in-band signaling for said Crypto API Client is by way of a gRPC field entry.

13. A method of in-band signaling to establish a Class of Service (CoS) on cryptographic transactions of a Hardware Security Module (HSM) that exposes the API to establish a Class of Service (CoS) on cryptographic transactions requested from at least one Crypto API Client, the method comprising the steps of:
  by way of an Application Programming Interface (API) 170exposed on an HSM app on said HSM,
    responding to a first API method to handle a Class of Service (CoS) attribute by at least one Crypto API Client via in-band signaling for a desired cryptographic service,
    wherein the CoS attribute signals a higher level of service for time-sensitive and high priority requests of the cryptographic transactions processed on the HSM;
  wherein the HSM comprises:
    a Main Processor hosting an HSM app exposing said API to said at least one Crypto API Client, and
    a Security Processor specialized to accelerate processing of said cryptographic transactions on the HSM based on the Class of Service (CoS) attribute;
  wherein the Main Processor comprises a software (SW) CoS Manager to logically
    prioritize and queue the API requests from the connection threads in the Connection Thread Pool that terminate TCP/TLS connections to API processing threads in an API processing thread pool, whereby
    each API processing thread is assigned to handle the cryptographic transactions associated with said desired cryptographic service, and determine from the CoS attribute and the cryptographic transactions whether to fulfill the cryptographic transactions in software on the main processor or via hardware prioritization via the Security Processor,
  wherein the at least one Crypto API Client is communicatively coupled to the HSM over the TCP/TLS secure communication channel to an internet protocol (IP) address and port.

14. The method of claim 13, further comprising:
  propagating the CoS attribute for the at least one Crypto API Client to intermediate nodes in a network path involved in processing the cryptographic transactions across multiple HSMs,
  where the intermediate nodes support a card scheme for a payment network and a node therein is one among: a payments merchant, a payments acquirer, a payments switch, and a payments issuer,
  wherein said propagating includes both passing and setting the CoS attribute on HSMs associated with the intermediate nodes.

\* \* \* \* \*